United States Patent
Galter

[15] 3,650,483

[45] Mar. 21, 1972

[54] SCRAP MILL

[72] Inventor: Helmut Galter, Kassel, Germany

[73] Assignee: Rheinstahl Henschel Aktiengesellschaft, Kassel, Germany

[22] Filed: Apr. 6, 1970

[21] Appl. No.: 26,073

[30] Foreign Application Priority Data

Apr. 10, 1969 Germany.....................P 19 18 123.8

[52] U.S. Cl..............................241/186 R, 241/33, 241/280
[51] Int. Cl..................................B02c 13/02, B02c 13/286
[58] Field of Search..............241/34, 35, 63, 64, 109, 101 A, 241/186 R, 33, 202, 205, 222, 246, 247, 265, 280, 281, 282, 301; 51/38; 146/131, 137

[56] References Cited

UNITED STATES PATENTS

| 3,524,485 | 8/1970 | Smith | 241/35 X |
| 2,682,374 | 6/1954 | Rietz | 241/186 X |
| 2,651,471 | 9/1953 | Noll | 241/186 X |
| 3,160,351 | 12/1964 | Shelton | 241/282 X |

Primary Examiner—Robert L. Spruill
Attorney—Walter Becker

[57] ABSTRACT

A scrap mill for crushing pre-pressed scrap packets to form smaller scrap pieces for further processing, in which the respective scrap packet to be crushed is fed toward the beater or crusher drum at an angle of approximately 45° with regard to the axis of rotation of said beater or crusher drum while said drum is reciprocable in the direction of its axis of rotation selectively toward and away from the scrap packet to be crushed.

5 Claims, 2 Drawing Figures

SCRAP MILL

The present invention concerns a scrap mill for crushing prepressed scrap packets of the same dimensions so as to obtain smaller scrap pieces for further processing. With scrap mills of this type it is necessary to keep in readiness a considerable driving power for driving the beater drum in order to be able to meet the peak power requirements.

Numerous solutions have been suggested in connection with feeding devices for scrap mills which aim at as uniform a flow as possible in order to obtain a uniform load on the beater drum during the crushing operation. For all heretofore known designs of the type involved, it is important and characteristic that the feeding device and the feeding plane are located at a right angle to the axis of the rotating beater drum. These arrangements, however, have the drawback that they do not avoid or eliminate the power peak of the drive for the beater drum when the respective residual piece of a scrap packet or a larger scrap piece enters the drum so that the drive must be laid out for the higher power reserve.

It is, therefore, an object of the present invention to provide a scrap mill which will avoid the occurrence of power peaks when residual pieces move into the beater drum so that the drive for the beater drum can be made smaller and less expensive.

Figure 1:
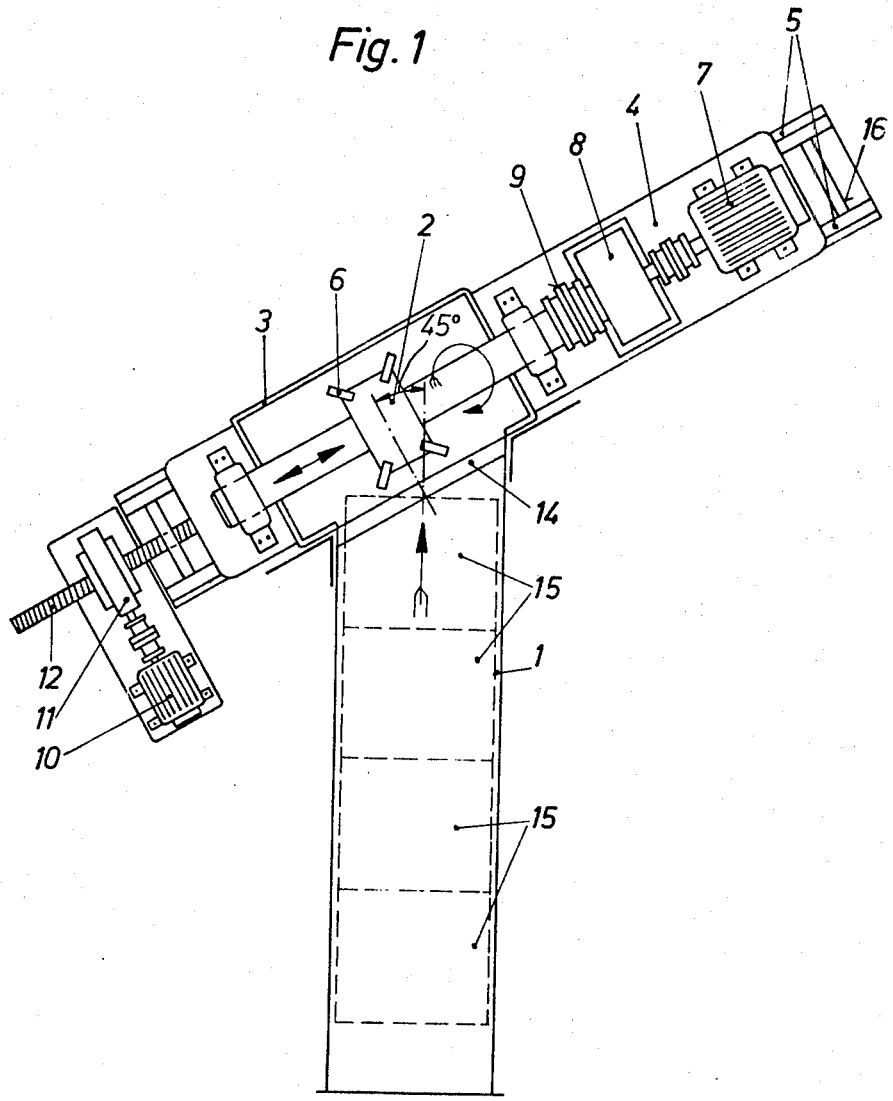

The object and other objects and advantages of the invention will appear more clearly from the following specification in connection with the accompanying drawings, in which:

FIG. 1 diagrammatically illustrates a top view of a scrap mill according to the invention.

Figure 2:
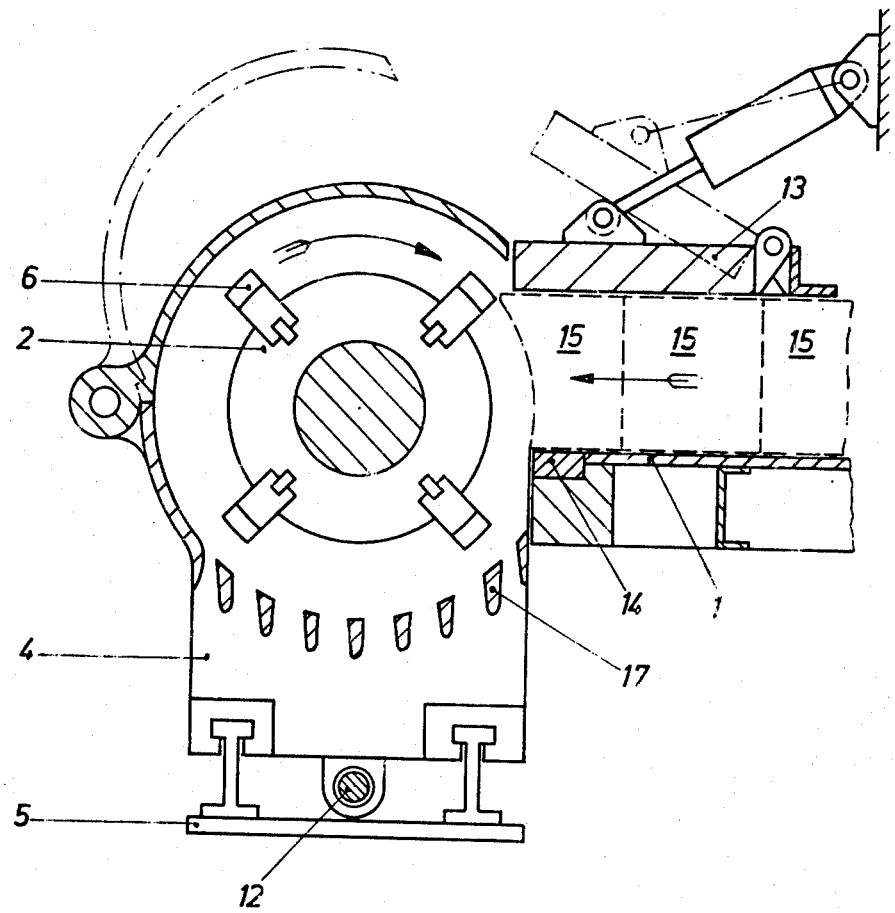

FIG. 2 is a section perpendicular to the axis of the beater.

The scrap mill according to the present invention for crushing prepressed scrap packets of equal dimensions to prepare smaller scrap pieces for further processing, is characterized primarily in that the device for feeding the scrap packets to be crushed is arranged at an angle of approximately 45° with regard to the axis of rotation of the beater drum. According to a further development of the present invention, there is provided a hydraulically operable pressure plate by means of which within the feeding device and during the crushing operation the scrap packet located directly in front of the beater drum and at least a further directly following scrap packet are pressed against the bottom of the feeding trough and can be firmly held thereagainst, said pressure plate being pivotally arranged above the feeding trough.

In order during the crushing of a scrap packet to maintain an approximately uniform power requirement at the drive of the beater drum, it is provided that the beater drum together with its drive is displaceable along the axis of rotation of the beater drum and that in a manner known per se, the feeding speed of the drum is infinitely variable and adjustable in conformity with the power consumption of the drive for the beater drum.

Referring now to the drawings in detail, the scrap packets 15 are by means of a feeding device not shown in the feeding trough 1, which is arranged at an angle of approximately 45° with regard to the axis of rotation of the beater drum 2, advanced stepwise in the direction toward the beater drum 2 and are by means of the pivotally mounted pressure plate 13, illustrated in FIG. 2, firmly clamped against the exchangeable beater strip 14 and the bottom of the feeding trough 1 in which condition they remain during the crushing operation. The beater drum 2 with the crusher tools 6 is together with its drive mounted on a carriage 4 which is displaceable on the guiding path 5 of the machine bed 16 in a direction parallel to the axis of rotation of the beater drum 2. During this operation, the carriage 4 is adapted to be driven by an infinitely variable feed motor 10, a transmission 11 and a threaded spindle 12. The said drive for the beater drum 2 comprises primarily a main driving motor 7, a transmission 8 and a coupling 9.

The feeding speed of the carriage 4 is in a manner known per se so controlled that at the drive motor 7 there will always be maintained a substantially uniform power requirement. As soon as the beater tools 6 of the beater drum 2 have disengaged the scrap packets 15 to be crushed, the pressure plate 13 is lifted temporarily for a short period, the scrap packets 15 are advanced by a feeding step and the two scrap packets 15 in front of the beater drum are again clamped fast whereupon the next pass through the beater drum 2 is effected. The crushed scrap drops through the grate 17 and is in customary manner removed from the scrap mill.

The advantages realized by the scrap mill according to the present invention consist primarily in that due to the simultaneous chucking or clamping of two successive scrap packets and the feeding of these packets at an angle of 45° to the axis of the beater drum, the heretofore known pulling-in of large residual pieces and thus the power peaks inherent thereto will be avoided in the main drive. Without having to take into consideration the said power peaks, the main drive can be designed smaller and thereby less expensive.

It is, of course, to be understood that the present invention is, by no means, limited to the particular showing in the drawings but also comprises any modifications within the scope of the appended claims.

What I claim is:

1. A scrap mill for crushing pre-pressed scrap packets of substantially uniform dimensions to form smaller scrap packets for further processing, which includes: rotatable beater drum means, driving means drivingly connected to said beater drum means for rotating the same, and conveying means for conveying scrap packets to be crushed to said beater drum means, said conveying means having an end portion adjacent to said beater drum means and to form therewith an angle of approximately 45°, and feeding means for feeding said beater drum means toward the respective nearest scrap packet to be crushed.

2. A scrap mill according to claim 1, in which said conveying means include trough means with bottom means for receiving and guiding the scrap packets to be crushed toward said beater drum means.

3. A scrap mill according to claim 2, which includes clamping means arranged at that end portion of said trough means which is adjacent said beater drum means, said clamping means being operable selectively to clamp at least the respective one scrap packet closest to said beater drum means against a bottom portion of said trough means so as to firmly hold the same during a crushing operation carried out by said beater drum means.

4. A scrap mill according to claim 3, in which said clamping means includes pressure plate means arranged above the bottom of said trough means, and hydraulically operable means operatively connected to said pressure plate means for actuating the same.

5. A scrap mill for crushing pre-pressed scrap packets of substantially uniform dimensions to form smaller scrap packets for further processing, which includes: rotatable beater drum means, driving means drivingly connected to said beater drum means for rotating the same, and conveying means for conveying scrap packets to be crushed to said beater drum means, said conveying means having an end portion adjacent to said beater drum means and to form therewith an angle of approximately 45°, means operatively connected to said beater drum means for displacing the same in the direction of its axis of rotation, the means for displacing the beater drum means including carriage means movable in the direction of the axis of rotation of said beater drum means and carrying both said beater drum means and said driving means therefor, and motor means drivingly connected to said carriage means for moving the same selectively in either of two opposite directions to cause said beater drum means to respectively work the respective adjacent scrap packet and to move away from said conveying means.

* * * * *